United States Patent [19]

Hochreiter et al.

[11] 4,059,836
[45] Nov. 22, 1977

[54] EXPOSURE CONTROL MECHANISM

[75] Inventors: William Thomas Hochreiter, Rochester; Loren Jackson Craig, Springwater; Fredric A. Mindler, Rochester, all of N.Y.

[73] Assignee: Eastman Kodak Company, Rochester, N.Y.

[21] Appl. No.: 673,515

[22] Filed: Apr. 5, 1976

[51] Int. Cl.² ............................................... G03B 7/18
[52] U.S. Cl. .................................................... 354/29
[58] Field of Search ............................. 354/29, 30, 231

[56] References Cited

U.S. PATENT DOCUMENTS

| | | | |
|---|---|---|---|
| 3,636,840 | 1/1972 | Harvey et al. | 354/29 |
| 3,812,498 | 5/1974 | Ernisse et al. | 354/29 |

Primary Examiner—L. T. Hix
Assistant Examiner—M. L. Gellner
Attorney, Agent, or Firm—T. H. Close

[57] ABSTRACT

A camera having an adjustable mechanism to set an exposure aperture, a shutter to control the duration of an exposure and a member movable in a first range to initiate adjustment of the mechanism and movable in a second range to actuate the shutter to open the exposure aperture, includes a single electromagnet effective to become energized and subsequently de-energized to control the mechanism to set a desired exposure aperture and effective to be energized during an open condition of the shutter to hold the shutter open until de-energization thereof. The electromagnet is connected in a control circuit that has a photosensor exposed to scene brightness and switches controlled by the movable member to operatively connect the photosensor to the electromagnet. The circuit is effective upon actuation of the switches during movement of the member in the first range to energize or to energize and then quickly de-energize the electromagnet to establish the desired exposure aperture in accordance with scene brightness, and during movement of the member in the second range to re-energize the electromagnet and after an exposure of duration related to scene brightness to de-energize the electromagnet to initiate shutter closure.

6 Claims, 6 Drawing Figures

EXPOSURE CONTROL MECHANISM

BACKGROUND OF THE INVENTION

1. FIELD OF THE INVENTION

This invention relates to exposure-control apparatus for use in a camera and more particularly to the use of a single electromagnet in a light-regulated circuit to control adjustment of a diaphragm and a shutter in relation to the level of scene brightness.

2. DESCRIPTION OF THE PRIOR ART

Camera exposure-control apparatus often use a light-responsive, electromagnetic circuit to control operation of a diaphragm and shutter in relation to scene brightness. Conventionally, the circuit uses two electromagnets, both initially energized. One electromagnet controls adjustment of the diaphragm and the other electromagnet controls closure of the shutter. A light-level measuring subcircuit comprising a photosensor and series-connected resistance is most often used for controlling the one electromagnet to adjust the diaphragm, and a light dependent R-C subcircuit comprising a photosensor and series-connected capacitance is used to control the other electromagnet to close the shutter. It has also been proposed to use a single electromagnet in conjunction with such circuit to control both the diaphragm and shutter, (See U.S. Pat. No. 3,385,187). The single electromagnet is coupled with the light-level measuring subcircuit and is initially energized to retain a locking pawl during the time when a diaphragm, in the form of a Waterhouse wheel, operates to vary an exposure aperture; the electromagnet becomes deenergized to release the pawl to lock the diaphragm at a selected aperture size related to scene brightness. The action of locking the diaphragm also locks a shutter blade to prevent the blade from moving to close the exposure aperture. The electromagnet is then coupled with the light dependent R-C circuit. At the end of an exposure interval as established by the R-C circuit, the electromagnet becomes re-energized and re-attracts the locking pawl to release the shutter blade so that it moves to close the exposure aperture. Thus, the electromagnet becomes de-energized to set the diaphragm and subsequently becomes re-energized to initiate shutter closing. When the electromagnet becomes energized to remove the locking pawl from its locking position, the electromagnet force must (1) act through an air gap, (2) act against the spring force holding the pawl in its locking position and (3) act against the mass of the locking pawl. The electromagnetic force required for such operation is high and requires a camera battery of high current capacity to reliably operate for long periods. To reduce the electromagnetic force and its attendant current drain on a camera battery, light spring forces are employed to hold the locking pawl in position. However, such light spring forces do not reliably lock the diaphragm or shutter; thus the use of the electromagnet in this manner to control the diaphragm and shutter does not provide effective use of a single electromagnet to control both diaphragm and shutter.

SUMMARY OF THE INVENTION

In accordance with the invention, a camera having an adjustable mechanism to set an exposure aperture, a shutter to control the duration of an exposure and a member movable in a first range to initiate adjustment of the aperture control mechanism and movable in a second range to actuate the shutter to open the exposure aperture, includes a single electromagnet which is energized and subsequently de-energized to control the mechanism to set a desired exposure aperture and subsequent re-energized to hold the shutter open throughout an exposure interval and then de-energized to initiate shutter closing. The electromagnet is connected in a control circuit that has a photosensor exposed to scene brightness and switch means controlled by the movable member to operatively connect the photosensor to the electromagnet. The circuit is effective, upon actuation of the switch means during movement of the member in the first range to energize or energize and then quickly de-energize the electromagnet to establish the desired exposure aperture in accordance with scene brightness, and during movement of the member in the second range to re-energize the electromagnet, and after an exosure of duration related to scene brightness to de-energize the electromagnet to initiate shutter closing.

BRIEF DESCRIPTION OF THE DRAWINGS

The invention and its advantages will become apparent upon reading the following description and upon reference to the drawings, in which.

DETAILED DESCRIPTION OF THE DRAWINGS

Figure 1:
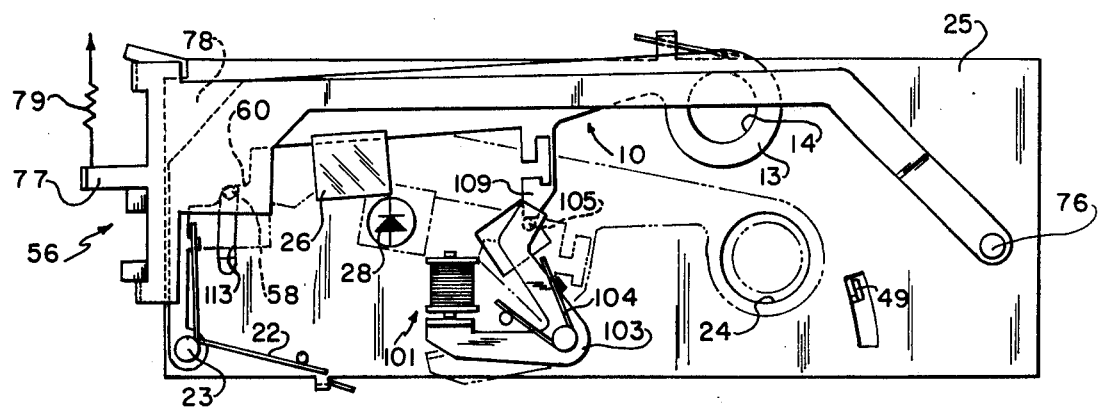
FIG. 1 is a front view of exposure control apparatus constructed in accordance with our invention showing a diaphragm and a control electromagnet that are part of the invention.

Because photographic cameras are well known, the present description will be directed in particular to elements forming part of, or cooperating more directly with, the present invention, camera elements not specifically shown or described herein being understood to be selectable from those known in the art.

Referring to the accompanying drawings there is shown exposure control apparatus according to a preferred embodiment of our invention. The apparatus includes a diaphragm 10, shown in FIG. 1, which comprises a pivotally mounted element 13 containing a single aperture 14, and a shutter 12 shown in FIGS. 2-4 which comprises blades 16, 18. The diaphragm element 13 is rotatable about a stud 23 toward a position in which aperture 14 coincides with an exposure aperture 24 located in a mechanism plate 25, on which the exposure control apparatus is mounted. The aperture 14 reduces the effective size of the exposure aperture 24 when in coincidence therewith. When the effective size of the exposure aperture is reduced, a neutral density filter 26, carried by the diaphragm element 13, is positioned over a photodiode 28 (the photodiode will be discussed later). The diaphragm element 13 normally occupies the position shown in FIG. 1, but is urged in a clockwise direction, as viewed in FIG. 1, by a spring 22. The diaphragm element 13 is held in this position by a pin 58 carried by the release member 56, the pin 58 engaging a shoulder 60 on the bottom of the diaphragm element 13.

The blades 16, 18 are opaque elements mounted on a stud 34 on the opposite side of plate 25 from the diaphragm element 13. When the shutter 12 is cocked, springs 39 and 40 respectively urge the blades 16, 18 to move in a clockwise direction, as viewed in FIG. 2 to respectively open and close the exposure aperture 24.

Figure 2:
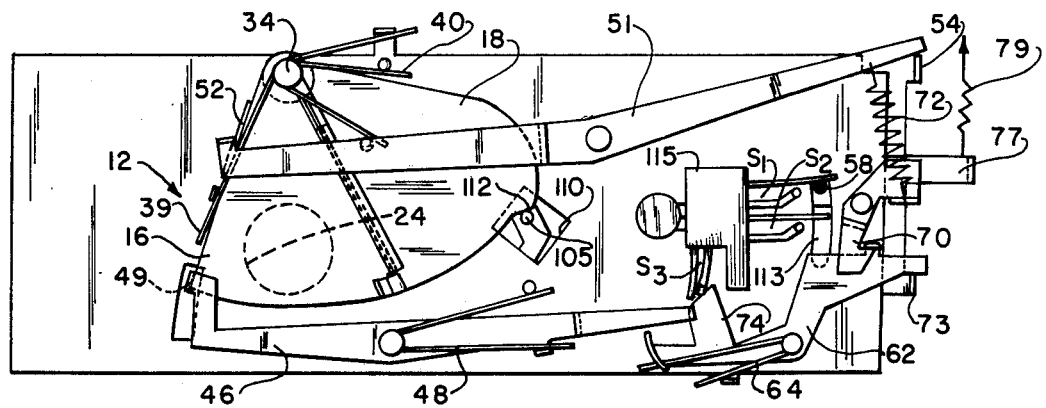
FIG. 2 is a rear view of the exposure control apparatus constructed in accordance with our invention showing a shutter mechanism in the cocked position.

A blade latch 46, urged into a latching position by a leg spring 48, retains the shutter 12 in its cocked position. In such a position, a tab 49 on the blade latch 46 engages and holds the lower leading edge of the blade 16, as shown in FIG. 2. When the shutter 12 is cocked, the blade 16 covers the exposure aperture 24; and through an abutting relationship of its trailing edge with the leading edge of the blade 18, it retains the blade 18 in a position to one side of the exposure aperture 24, e.g. the right side in FIG. 2. When the apparatus is in the cocked position, a shutter-cocking element 51, whose function will be described later, engages a raised portion 52 of the leading edge of the blade 16, the element 51 being held in that position by a lug 54 of a release member 56. The engagement of shutter 12 by element 51 is not functional in retaining the shutter 12 in the cocked position, and is removed as the release member 56 is operated.

Figure 3:
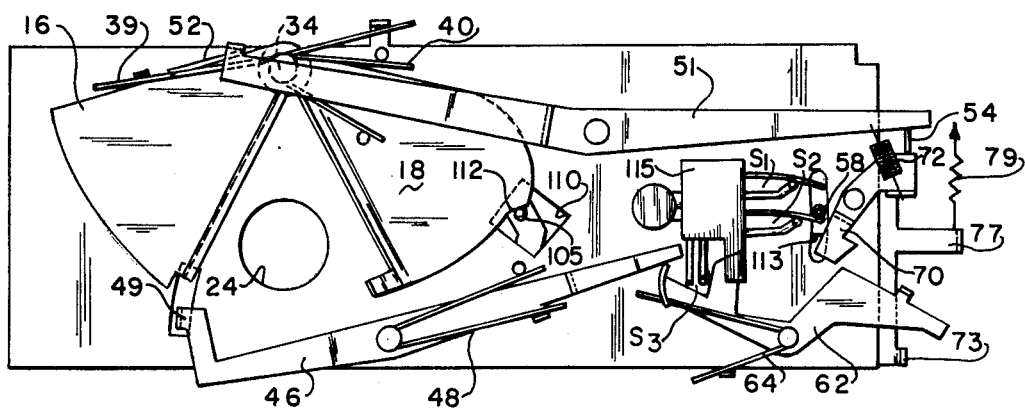
FIG. 3 is a view similar to that of FIG. 2 but showing the relative position of the elements of the shutter while the shutter is open.
Figure 4:
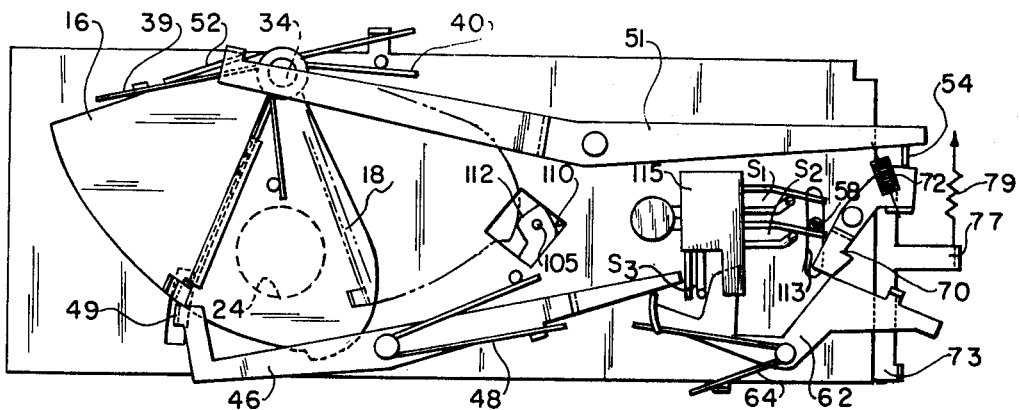
FIG. 4 is a view similar to FIG. 2, showing the relative position of the elements of the shutter when the shutter is closed.

The blade latch 46 is released by an impact actuator 62 that is pivotally mounted on the plate 25 and biased by a spring 64 for clockwise movement, as viewed in FIGS. 2-4 to impact the blade latch 46. A latch 70, positioned in its latching position by a spring 72 connected between one end of the cocking element 51 and one end of the latch 70, holds the actuator 62 in its tensioned position. When the cocking element 51 is moved to cock the shutter 12, it stretches the spring 72, creating tension therein to draw the latch 70 into its latching position. The spring 72 also pivots the cocking element 51 clockwise out of contact with the blade 16 as the release member 56 is operated. A lug 73 on the release member 56 positions the actuator 62 to be latched by the latch 70. An upright extension 74 on the actuator 62 engages and holds normally open switch $S_3$ closed. The switch $S_3$, a shutter timing switch of control circuit 100, to be fully described hereafter, is opened in conjunction with movement of the actuator 62 to release the blade latch 46. The start of shutter timing may thus by synchronized with opening of the exposure aperture 24 by the blade 16.

As may best be seen by reference to FIG. 1, the release member 56, previously referred to, is elongated and pivotally mounted to plate 25 at a post 76. An extension 77, located on a body portion 78 thereof, may be accessible from an exterior portion of the camera by a camera operator. The release member 56 is held in the position of FIG. 1 by a spring 79.

In carrying out the invention, a single electro-magnet 101 and associated armature 103 cooperate to control the diaphragm 10 and the shutter 12 in conjunction with the operation of the release member 56. The electromagnet 101 is controlled by the circuit 100, as will be described more fully later, as the circuit 100 is switched between an aperture-adjust mode and a shutter-control mode during movement of the release member 56. A spring 104 lightly biases the armature 103 toward the electromagnet 101, and into a position in which a pin 105 on the armature 103 engages a depending segment 109 of the diaphragm element 13; the pin 105 also extends through an opening 110 in the plate 25 to engage a lip 112 on the blade 18. Thus the armature 103 couples the diaphragm element 13 and the blade 18 with the electromagnet 101. Because the blade 16 holds the blade 18, the armature 103 is initially free to control the diaphragm element 13 as the release member 56 is depressed; and if the electromagnet 101 is de-energized, it releases the diaphragm element 13 to move to the position shown by phantom lines of FIG. 1. The armature 103 then returns, under bias of the spring 104, to the position of FIG. 1 in which the pin 105 re-engages the lip 112 in readiness to control the closure of blade 18. Note that the segment 109 is irregularly shaped. The irregularity in shape gives it resilience to move past the pin 105 when resetting the diaphragm element 13 during a time which the electromagnet 101 is in an energized condition. Such could be the case if an operator attempts an exposure in a relatively dim light situation but releases the release member 56 before the blade 16 is opened, but after the diaphragm element 13 moves to adjust the effective size of the exposure aperture.

Switching of the circuit 100 to control the electromagnet 101 is effected by the pin 58 as the release member 56 is operated. The pin 58 is located on the release member 56 to extend through a slot 113 in the plate 25 to sequentially close the contact elements of switches $S_1$ and $S_2$. The pin 58 may be of a non-conductive material to prevent shorting the switch elements to ground when in contact therewith. The switches $S_1$ and $S_2$ (and $S_3$) are housed in a plastic mount 115 on the plate 25, such that initial travel of the pin 58 closes the switch $S_1$, putting the circuit in an aperture adjust mode, and further travel closes the switch $S_2$ putting the circuit 100 in readiness for shutter timing. The switch $S_1$ is normally closed but held open by the pin 58, as shown in FIG. 2, and the switch $S_2$ is normally open but subsequently closed and held closed by the pin 58, as shown in FIG. 3. The circuit 100 may also be encased in a plastic housing that is coupled with the mount 115 so that the switches $S_1$, $S_2$ and $S_3$ may be electrically connected with the circuit 100.

Figure 5:
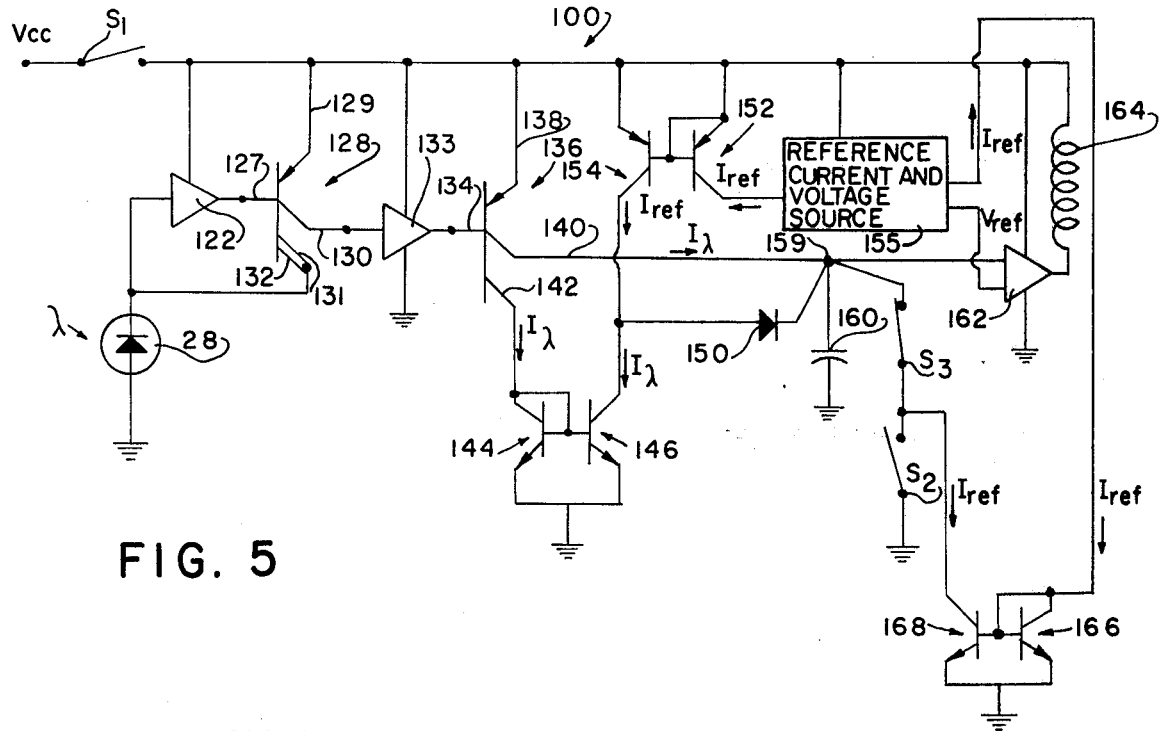
FIG. 5 shows an electronic circuit suitable for use with the apparatus of FIGS. 1-4.

The circuit 100, schematically shown in FIG. 5, controls the state of electromagnet 101 and ultimately controls the setting of the diaphragm element 13 and closure of the blade 18. The circuit 100 includes a photometric section that uses the silicon photodiode 28. The output of the photodiode, when stimulated by light, is inserted into a current amplifier 122 such that the amplifier 122 measures the short circuit current of the photodiode 28. The current amplifier 122 has an output that is equal to, or is a function of the short circuit current of the photodiode 28. The amplifier 122 may be a typical bipolar integrated circuit device, preferably having unity gain, which is compatible with the photodiode 28 to permit the photodiode 28 to become zero biased when coupled therewith. The output of the amplifier 122 is coupled to the base junction 127 of a multicollector PNP transistor 128 (preferably a lateral transistor). In the present application of the transistor 128, its emitter 129 is coupled to a battery supply, VCC, and each of three collectors 130, 131 and 132 has an equal percentage of the total current flowing in the device. Collectors 131, 132 being tied together, return twice the short circuit current which divides equally between the amplifier 122 and the photodiode 28, when the circuit is balanced. Such a photometric device is disclosed in commonly assigned U.S. application Ser. No. 631,272 filed in the name of R. Maigret on Nov. 12, 1975.

The collectors 130, 131 and 132 carry current that may be in the order of 10 nanoampere/footcandle. To raise the current to a working level, the current carried by collector 130 is input to an amplifier 133, which may be a conventional current amplifier. To provide a number of currents to perform a number of camera functions, the current from the amplifier 133 is coupled to the base 134 of a multicollector PNP transistor 136. The transistor 136 is preferably of the same type as the transistor 128. Its emitter 138 is referenced to VCC and each of its two collectors 140, 142 carry a current that will be hereafter referred to as photocurrent and labeled $I\lambda$ for clarity. Bottom collector 142 is coupled to an NPN diode-biased transistor circuit commonly referred to as a current mirror, comprising transistors 144, 146. The base and collector of transistor 144 are connected together, and the bases and emitters of the transistors 144, 146 are connected together; the two collector currents are thus equal, as is well known in the art. Therefore, as shown, photocurrent flowing in the transistor 144 is mirrored in the transistor 146. Transistor 146 acts to sink current and will be referred to hereafter as photocurrent sink 146. The collector of photocurrent sink 146 is coupled to the anode of a diode 150. A PNP current mirror is also coupled to the anode of the diode 150. The PNP current mirror comprises a similar configuration to the NPN current mirror except for the polarity of its transistors 152, 154. The transistor 154 acts as a current source and will be referred to hereafter as reference current source 154. A reference current and voltage source 155 supplies a constant current, $I_{Ref}$, to the PNP current mirror. The reference current is of a level related to a predetermined scene brightness. The level of the reference current determines a transistion point of the timing circuit, i.e., a time at which the exposure time goes from a variable time to a fixed time. This time, which may, for example, be 1/30 sec., is generally considered to be the longest time that the camera can conveniently be held steady by hand during the entire exposure.

The cathode of the diode 150 is coupled to a node 159 that is connected to an integrating capacitor 160 and to one input of a trigger circuit 162. The trigger circuit 162 may, for example, be a comparator circuit of differential form that receives one of its inputs, $V_{Ref}$, from the source 155. The output of the trigger circuit 162 regulates the condition of the electromagnet 101, via switching current through its coil 164. The electromagnet 101 is normally energized. As is well known in the art, the charge on the capacitor 160 is compared to $V_{Ref}$, and when it exceeds $V_{Ref}$, the trigger circuit 162 de-energizes the electromagnet 101.

The two switches $S_2$, $S_3$ and an NPN current mirror comprising transistors 166, 168 are connected with the node 159. The transistor 166 is connected to the source 155, receiving $I_{Ref}$ to be mirrored in transistor 168. Transistor 168 will be referred to as reference current sink 168. The switch $S_3$, when closed with the switch $S_2$ open, connects the sink 168 to node 159 (the capacitor 160) and the switch $S_2$, when closed, shunts the sink 168 to ground and also shunts the node 159, to ground if $S_3$ is also closed.

The apparatus of our invention operates as follows. The release member 56 moves downwardly against the restoring force of the spring 79 as the extension 77 is depressed. During such movement, the pin 58, being carried thereby closes the switch $S_1$ to energize the circuit 100. The lug 54 moves downward, and the cocking element 51 rotates clockwise under force of the spring 72, disengaging from the blade 16 to occupy the position shown in FIG. 3. At this position in the movement of the release member 56, switch $S_1$ is closed, switch $S_2$ is open, and switch $S_3$ is closed. The charge on the capacitor 160 is approximately 0 volts, the capacitor 160 having been discharged, for example, through common closure of the switches $S_2$, $S_3$ during a previous exposure. The junction at the input of the trigger circuit 162 changes its potential depending upon the level of the photocurrent and the reference current. First consider a condition of high scene brightness, (above a level in which exposure may be made without the aid of artificial light). In such condition, the photocurrent sink 146 attempts to draw more current than the reference current source 154 can supply. The photocurrent sink 146 saturates and the anode of diode 150 is grounded causing the diode 150 to become reverse biased. Also, since the magnitude of the photocurrent from the collector 140 is greater than the reference current demanded by the reference current sink 168, the capacitor 160 will charge positively. Algebraically, the current charging the capacitor 160 is equal to $(I\lambda - I_{Ref})$. When the charge on the capacitor 160 exceeds $V_{Ref}$, the trigger circuit 162 terminates the flow of current through the coil 164 and the electromagnet 101 de-energizes. The charging of the capacitor 160 is very rapid and causes the electromagnet 101 to become de-energized long before release member 56 moves far enough to close the switch $S_2$. Because the electromagnet 101 is in a de-energized condition, the armature 103 is released, and as the pin 58 moves in the slot 113, the force of spring 22 overcomes the force of the spring 104; the segment 109 forces past the pin 105 and diaphragm element 13 moves in a clockwise direction to cover the exposure aperture 24. Such position of the diaphragm element 13 is shown by phantom lines in FIG. 1. As the diaphragm element 13 moves, the filter 26 is placed over the photodiode 28 to compensate the circuit 100, during exposure timing, for the reduction in effective size of the exposure aperture. After the segment 109 moves past the pin 105, the armature 103 returns to the position of FIG. 1 in readiness to control closure of the blade 18.

The opposite situation occurs during exposure in a relatively dim light. In such a situation, the predominate current is the reference currents since the reference current source 154 supplies more current than the photocurrent sink 146 wants to draw. The potential at the anode of the diode 150 rises and forward biases the diode 150 to pass a current equal to the reference current minus the photocurrent $(I_{Ref} - I\lambda)$. The photocurrent $I\lambda$ from the collector 140 is added to the subtracted current $(I_{Ref} - I\lambda)$. The resultant current is equal to the current into reference current sink 168, and the charge on the capacitor 160 remains at zero volts. Algebraically, the current charging the capacitor 160 under these conditions would be equal to zero $(I_{Ref} - I\lambda + I\lambda + I_{Ref} = 0)$. The electromagnet 101 therefore does not become de-energized, and diaphragm element 13 does not move to reduce the effective size of the exposure aperture.

By further movement of the release member 56, the switch $S_2$ is closed in preparation for shutter timing. Because $S_3$ is series connected with $S_2$, closure of $S_2$ shunts the capacitor 160 and reference current sink 168 to ground. The capacitor 160 is thus discharged before start of the shutter-timing operation. When the capacitor 160 is discharged, the electromagnet 101 becomes re-energized, if it had previously been de-energized so as to cause the diaphragm element 13 to reduce the effective size of the exposure aperture. On the other hand, if the electromagnet 101 remained energized during the aperture-adjust mode, it will stay energized. In either event the armature 103 now retains the blade 18 in the cocked position. The trip lug 54 releases the latch 70, and the actuator 62 moves to release the latch 46. The blade 16 is released and moves, under the force of the spring 39, to the position shown in FIG. 3 in which the raised portion 52 of its leading edge re-engages the cocking element 51. During movement of the actuator 62, the switch $S_3$, normally held closed, is opened. When switch $S_3$ is opened, the charge on the capacitor 160 is developed by the photocurrent from the collector 140 under conditions of high scene brightness, or from the difference between the current from the reference current source 154 and the photocurrent sink 146 plus the photocurrent from the collector 140 under conditions of low scene brightness (the reference sink 168 having been shunted to ground). As in the aperture-adjust mode, the difference between the currents in the collector circuits of the photocurrent sink 144 and reference current source 154 is applied to the anode of the diode 150. When scene brightness is high, the photocurrent sink 146 saturates, and the current to charge the capacitor 160 is provided solely by the photocurrent from the collector 140. When, on the other hand, scene brightness is low, the difference current resulting from the reference current being larger than the photocurrent causes transistor 154 to attempt to saturate; when doing so, the potential at the anode of the diode 150 is raised and the diode 150 is forward biased. It passes current equal to the difference in the currents in the collectors of transistors 146, 154. This difference ($I_{Ref} - I\lambda$) charges the capacitor 160, along with the photocurrent from collector 140. Algebraically adding these currents at the input results in a current to charge the capacitor 160 that is equal to the reference current, $I_{Ref}$, ($I\lambda + I_{Ref} - I\lambda = I_{Ref}$). The reference current being of a level related to a predetermined scene brightness generates a timing signal that is equivalent to the longest time the camera can be effectively hand-held steady throughout the entire exposure. The capacitor 160, being coupled to the input of the trigger circuit 162, now de-energizes the electromagnet 101 to control closure of the blade 18. Thus after a time interval related to the level of either the photocurrent or reference current, whichever is greatest, the voltage in the capacitor 160 exceeds that of $V_{Ref}$ and the trigger circuit 162 changes its operating state. The blade 18 moves to cover the exposure aperture 24. If the light is dim and the diaphragm element 13 is held by the armature 103, the diaphragm element 13 moves down when the blade 18 is released to close. However, the blade 18 closes before the diaphragm element 13 reaches the exposure aperture 24.

Cocking of the apparatus is effective during return of the release member 56 to the position of FIG. 1, under force of the spring 79. During such return motion, the pin 58 forces the diaphragm element 13 toward the position of FIG. 1. Also, the pin 58 opens the switches $S_2$, $S_1$, and the lug 54 pivots the cocking element 51 counterclockwise to position blades 16, 18 in the position of FIG. 1. The lug 73 on the bottom of the release member 56 moves the actuator 62 into position to be latched. The counterclockwise pivotal movement of the cocking element 51 creates tension in the spring 72 to re-position the latch 70 to latch the actuator 62. The switch $S_3$ is closed by the extension 74. The diaphragm 10 and shutter 12 are now cocked for another exposure.

Figure 6:
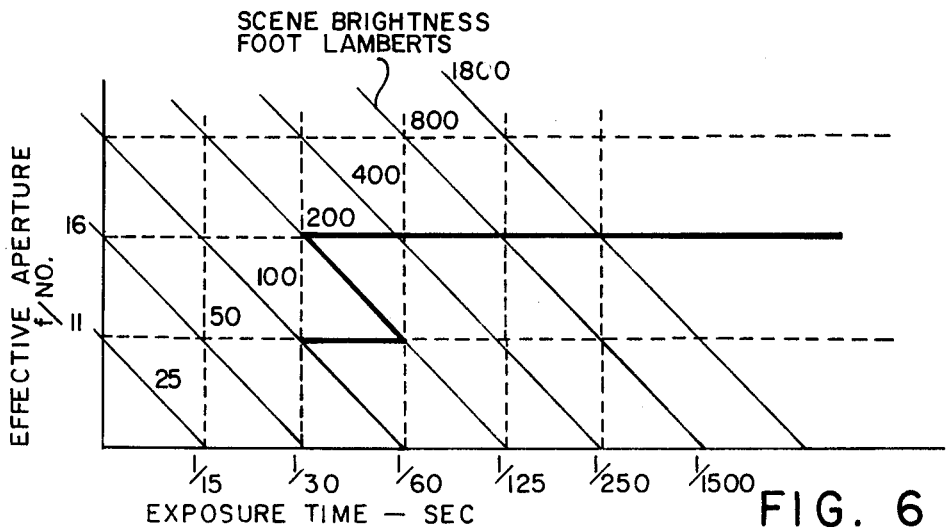
FIG. 6 is a characteristic operating curve for the apparatus of FIGS. 1-5, showing exposure time vs. aperture over a range of scene brightness.

A program of operation for the apparatus is shown in FIG. 6. During operation in scene brightness ranging between a very bright condition such as, for example, 1800 a footlamberts and a low brightness condition such as, for example, 200 footlamberts the electromagnet 101 becomes de-energized to cause the diaphragm element 13 to effect an aperture setting such as $f/16$. As scene brightness decreases, there is a corresponding increase in exposure time. Thus normal operating conditions are at an $f/16$ aperture with varying exposure time as scene brightness varies. At a scene brightness of, for example, 200 ftlamberts, the electromagnet 101 no longer becomes de-energized during the aperture adjust period, and the diaphragm element 13 does not reduce the size of the aperture setting which may, for example, be $f/11$. Because the diaphragm element 13 does not reduce the effective size of the exposure aperture, the neutral density filter 26 does not cover the photodiode 28 to produce a corresponding increase in the duration of the exposure interval. The exposure interval varies as scene brightness varies until a duration is reached in which an operator can no longer effectively hand-hold the camera steady during the entire exposure. Thereafter, the exposure interval remains constant at the level established by the reference current.

The invention has been described in detail with particular reference to a preferred embodiment thereof, but it will be understood that variations and modifications can be effected within the spirit and scope of the invention.

We claim:

1. In a camera having an adjustable mechanism to set an exposure aperture, a shutter to control exposure duration, and a member movable to actuate said shutter to open said exposure aperture to initiate an exposure, movement of said member within a predetermined initial range being ineffective to actuate said shutter to open, the improvement comprising:

means, including an electromagnet, effective upon energization and subsequent de-energization of said electromagnet for controlling said mechanism to set a desired exposure aperture and effective, when said electromagnet is energized with said shutter open, for holding said shutter open until de-energization thereof;

a photosensor exposed to scene brightness; and circuitry including switch means controlled by said movable member for operatively connecting said photosensor to said electromagnet, said circuitry being effective 1) to energize and then temporarily de-energize said electromagnet to establish a restricted exposure aperture setting in accordance with scene brightness during movement of said member in said initial range and 2) to re-energize said electromagnet, and after an exposure of duration related to scene brightness, to again de-energize said electromagnet.

2. In a camera having an adjustable mechanism to set an exposure aperture, a shutter to control exposure duration and a member movable in a first range to initiate adjustment of said mechanism and movable in a second range to actuate said shutter to open said exposure aperture to initiate an exposure, the improvement comprising:

means including an electromagnet, for controlling said mechanism to set a desired exposure aperture upon de-energization of said electromagnet and when said shutter is open and said electromagnet is energized for holding said shutter open until said electromagnet is de-energized;

a photosensor exposed to scene brightness; and circuit means, including switch means controlled by said movable member for operatively connecting said photosensor to said electromagnet, for effecting, upon actuation of said switch means during movement of said member in said first range, a de-energized condition of said electromagnet during scene brightness above a predetermined brightness to establish a desired exposure aperture setting in accordance with said brightness, and for effecting, upon actuation of said switch means during movement of said member in said second range, energization of said electromagnet and after an exposure of duration related to scene brightness, a subsequent de-energization of said electromagnet.

3. In a camera, exposure control apparatus comprising:

an adjustable diaphragm to set an exposure aperture;

a shutter mechanism, movable to open and close said exposure aperture;

a member movable in a first range to initiate adjustment of said diaphragm and movable in a second range to actuate said shutter mechanism to open said exposure aperture to initiate an exposure;

an electromagnet, effective to become energized and subsequently de-energized to control said diaphragm to set a desired exposure aperture upon de-energization thereof, and effective to be energized during an open conditon of said shutter mechanism to hold said shutter mechanism open until subsequent de-energization of said electromagnet;

means, coupling said electromagnet with said diaphragm and said shutter mechanism and being responsive to said electromagnet when de-energized, for effecting setting of said diaphragm at said desired aperture or release of said shutter mechanism to close;

a photosensor located to receive scene brightness;

circuit means, including switch means actuatable by said member for operatively connecting said photosensor with said electromagnet, for effecting, upon actuating of said switch means during movement in said first range, temporary de-energization of said electromagnet, and for effecting, upon actuation of said switch means during movement in said second range, energization of said electromagnet and de-energization thereof after an exposure of duration related to scene brightness; and means, cooperative with said shutter mechanism, for actuating said switch means in conjunction with opening of said shutter mechanism to cause said circuit to de-energize said electromagnet after said duration related to scene brightness.

4. In a camera, exposure control apparatus comprising:

means defining an exposure aperture;

a diaphragm movable from a first to a second position for reducing the size of said exposure aperture;

shutter means movable to open and close said exposure aperture;

a member movable in a first range to effect movement of said diaphragm means toward said second position and movable in a second range to effect opening of said shutter;

means including an electromagnet for retaining said diaphragm in said first position during an energized condition of said electromagnet and to cause said diaphragm to move to said second position upon de-energization thereof, and effective during an energized condition of said electromagnet when said shutter occupies an open position relative to said exposure aperture for holding said shutter in said open position and upon de-energization of said electromagnet for causing said shutter to move to close said exposure aperture;

a photosensor located to receive scene brightness; and a circuit including switch means controlled by said movable member for operatively connecting said photosensor to said electromagnet, said circuit being effective upon actuation of said switch means during movement of said member in said first range to energize and temporarily de-energize said electromagnet in accordance with scene brightness and being effective upon actuation of said switch means during movement of said member in said second range to re-energize said electromagnet and after a duration related to scene brightness to again de-energize said electromagnet.

5. In a camera, exposure control apparatus comprising:

means defining an exposure aperture;

an apertured diaphragm movable from a first to a second position to reduce the size of said exposure aperture;

a first shutter blade movable to open said exposure aperture;

a second shutter blade movable to close said exposure aperture;

a member, movable in a first range to effect movement of said diaphragm from said first toward said second position and in a second range to effect movement of said first shutter blade to open said exposure aperture, said movement in said first range being ineffective to effect movement of said first shutter blade;

means, including an electromagnet, coupled with said diaphragm and said second shutter blade and being responsive to energization and de-energization of said electromagnet, for retaining said diaphragm in said first position during an energized condition of said electromagnet or said second shutter blade in said open position and being releasable for causing said diaphragm to move to said second position or said second shutter blade to close during a de-energized condition of said electromagnet;

a photosensor exposed to scene brightness;

circuit means, including switch means controlled by said movable member to operatively connect said photosensor to said electromagnet, for effecting, upon actuating said switch means during movement of said member in said first range, de-energization of said electromagnet to cause said diaphragm to move to said second position, and for effecting, upon actuation of said switch means during movement in said second range, energization of said correspondence with the movement of said first shutter blade for effecting de-energization of said electromagnet after a duration related to scene brightness; and means, cooperative with said first shutter blade for actuating said switch means in correspondence with the opening movement of said first shutter blade.

6. In a camera having an adjustable mechanism to set an exposure aperture, a shutter to control exposure duration, and a member movable to actuate said shutter to open said exposure aperture to initiate an exposure, movement of said member within a predetermined initial range being ineffective to actuate said shutter to open, the improvement comprising:

an armature releasably engageable with said aperture setting mechanism and said shutter;

an electromagnet operatively associated with said armature and effective upon energization to hold said armature in engagement with said aperture setting mechanism and upon subsequent de-energization to release said armature from engagement with said aperture setting mechanism to control said mechanism to set a desired exposure aperture during movement of said member within said predetermined initial range, and effective, when energized upon movement of said member past said predetermined initial range to hold said armature in engagement with said shutter to hold said shutter open until de-energization thereof;

a photosensor exposed to scene brightness; and circuitry including switch means controlled by said movable member for operatively connecting said photosensor to said electromagnet, said circuitry being effective (1) to energize and then temporarily de-energize said electromagnet to establish a restricted exposure aperture setting in accordance with scene brightness during movement of said member in said initial range and (2) to re-energize said electromagnet, and after an exposure of duration related to scene brightness, to again de-energize said electromagnet.

* * * * *

UNITED STATES PATENT OFFICE
CERTIFICATE OF CORRECTION

PATENT NO. : 4,059,836

DATED : November 22, 1977

INVENTOR(S) : W. T. Hochreiter, L. J. Craig, F. A. Mindler

It is certified that error appears in the above-identified patent and that said Letters Patent are hereby corrected as shown below:

Column 1, lines 32-33   Please delete "deenergized" and substitute therefor --de-energized--

Column 1, line 47   Please delete "electromagnet" and substitute therefor --electromagnetic--

Column 2, line 2   Please insert after energized --or energized--

Column 2, lines 3-4   Please delete "subsequent" and substitute therefor --subsequently--

Column 3, line 59   Please delete "electro-magnet" and substitute therefor --electromagnet--

Column 6, line 48   Please delete "currents" and substitute therefor --current,--

Column 6, lines 59-60   Please delete "$(I_{Ref}-I\lambda+I\lambda+I_{Ref}=0)$" and substitute therefor --$(I_{Ref}-I\lambda+I\lambda-I_{Ref}=0)$--

Signed and Sealed this

Second Day of May 1978

[SEAL]

Attest:

RUTH C. MASON
Attesting Officer

LUTRELLE F. PARKER
Acting Commissioner of Patents and Trademarks